US008943557B2

(12) United States Patent
Kelley

(10) Patent No.: US 8,943,557 B2
(45) Date of Patent: Jan. 27, 2015

(54) ENROLLMENT OF USER IN DEVICE IDENTIFICATION PROGRAM

(71) Applicant: Bank of America Corporation, Charlotte, NC (US)

(72) Inventor: William Earnest Kelley, Charlotte, NC (US)

(73) Assignee: Bank of America Corporation, Charlotte, NC (US)

(*) Notice: Subject to any disclaimer, the term of this patent is extended or adjusted under 35 U.S.C. 154(b) by 24 days.

(21) Appl. No.: 13/749,209

(22) Filed: Jan. 24, 2013

(65) Prior Publication Data
US 2014/0208389 A1 Jul. 24, 2014

(51) Int. Cl.
G06Q 30/02 (2012.01)
G06Q 40/00 (2012.01)
H04L 29/08 (2006.01)
H04W 4/02 (2009.01)
H04L 29/06 (2006.01)
G06Q 40/02 (2012.01)

(52) U.S. Cl.
CPC .......... *H04L 63/08* (2013.01); *H04L 29/08657* (2013.01); *G06Q 30/0261* (2013.01); *G06Q 40/02* (2013.01); *H04W 4/02* (2013.01); *G06F 2221/2111* (2013.01)
USPC ................ 726/4; 705/14.58; 705/56; 705/67; 705/68; 705/73; 380/258

(58) Field of Classification Search
CPC .................. G06F 2221/2111; H04L 29/08657; H04W 4/02; G06Q 30/0261; G06Q 40/02
USPC ............. 726/4; 705/14, 14.58, 50, 56, 70, 73, 705/64–68; 380/258
See application file for complete search history.

(56) References Cited

U.S. PATENT DOCUMENTS

| 2008/0097851 | A1* | 4/2008 | Bemmel et al. ................. 705/14 |
| 2008/0108322 | A1  | 5/2008 | Upp |
| 2010/0222037 | A1* | 9/2010 | Dragt .......................... 455/414.1 |
| 2011/0078773 | A1* | 3/2011 | Bhasin et al. ..................... 726/5 |
| 2011/0166976 | A1* | 7/2011 | Krein et al. ..................... 705/35 |
| 2011/0213658 | A1* | 9/2011 | Joa et al. .................... 705/14.52 |

OTHER PUBLICATIONS

InAuth Advanced Security. Inauth.com. http://www.inauth.com. 3 pages. Retrieved Apr. 24, 2013.
University of Wisconsin-Madison. "*User Authentication and Levels of Assurance*." CIO Office. UW-Madison. http://www.cio.wisc.edu/security-initiatives-levels.aspx. 4 pages. Retrieved Apr. 24, 2013.

(Continued)

Primary Examiner — Tae Kim
Assistant Examiner — Louis Teng
(74) Attorney, Agent, or Firm — Michael A. Springs; Moore & Van Allen PLLC; Sreenivas Vedantam

(57) ABSTRACT

Embodiments of the invention are directed to systems, methods and computer program products for enrolling a user in a device identification program. In some embodiments, a system is configured to: receive device identification information from a mobile device, receive user information associated with a user, the user information enabling identification of the user, associate the device identification information with the user information, and create a record based on the device identification information and the user information.

19 Claims, 7 Drawing Sheets

(56) References Cited

OTHER PUBLICATIONS

Franklin, Jason et al. "*Passive Data Link Layer 802.11 Wireless Device Driver Fingerprinting.*" https://share.sandia.gov/news/resources/releases/2006/images/wireless-fingerprinting.pdf. 12 pages. Retrieved Apr. 14, 2013.

InAuth Advanced Security. Inauth.com. http://www.inauth.com/_mobile-authentication/. © 2013 InAuth. 2 pages. Retrieved May 28, 2013.

* cited by examiner

ENROLLMENT OF USER IN DEVICE IDENTIFICATION PROGRAM

BACKGROUND

Mobile devices are becoming ubiquitous. Growth in sales, adoption, and usage is skyrocketing. When a user accesses an application on a mobile device, a user identifies himself or herself by providing a username (and a password for authentication). What is needed is a new mechanism for identifying a user.

BRIEF SUMMARY

Embodiments of the invention are directed to systems, methods and computer program products for enrolling a user in a device identification program. In some embodiments, an apparatus is provided for enrolling a user in a device identification program. The apparatus comprises: a memory; a processor; and a module stored in the memory, executable by the processor, and configured to: receive device identification information from a mobile device; receive user information associated with a user, the user information enabling identification of the user; associate the device identification information with the user information; and create a record based on the device identification information and the user information.

In some embodiments, the module is further configured to transmit to the mobile device an option to enroll in a device identification program.

In some embodiments, the module is further configured to transmit to the mobile device at least one term or condition associated with the device identification program.

In some embodiments, the module is further configured to receive the user's approval to enroll in a device identification program.

In some embodiments, the module is further configured to receive the user's approval to receive location information associated with the mobile device.

In some embodiments, the user information is received after the device identification information.

In some embodiments, the user information comprises at least one of information associated with the user or an account associated with the user.

In some embodiments, the user information comprises at least one of a name, contact information, a username, a password, social network information, an account number, or a card number.

In some embodiments, wherein the device identification information comprises an identification code.

In some embodiments, the device identification information is associated with a chip or a removable part associated with the mobile device.

In some embodiments, the device identification information comprises at least one of a telephone number, a serial number, an International Mobile Station Equipment Identity (IMEI) number, or a part number.

In some embodiments, the device identification information is not based on user input received at the mobile device.

In some embodiments, the user information is based on user input received at the mobile device.

In some embodiments, the mobile device comprises at least one of a mobile communication device or a mobile computing device.

In some embodiments, the module is further configured to: determine an account associated with the user information; identify the user based on information associated with the account.

In some embodiments, wherein the module is further configured to: determine initiation of an application on the mobile device; receive second identification information from the mobile device; search a database of records based on the second identification information; in response to determining a match between the identification information associated with the record and the second identification information, enable access to the application.

In some embodiments, the application comprises a financial service application.

In some embodiments, the module is further configured to enable access to the application based on a location associated with the mobile device at the time of the initiation of the application on the mobile device.

In some embodiments, a method is provided for enrolling a user in a device identification program. The method comprises: receiving device identification information from a mobile device; receiving user information associated with a user, the user information enabling identification of the user; associating the device identification information with the user information; creating a record based on the device identification information and the user information.

In some embodiments, a computer program product is provided for enrolling a user in a device identification program. The computer program product comprises a non-transitory computer-readable medium comprising a set of codes for causing a computer to: receive device identification information from a mobile device; receive user information associated with a user, the user information enabling identification of the user; associate the device identification information with the user information; create a record based on the device identification information and the user information.

BRIEF DESCRIPTION OF THE DRAWINGS

Figure 1:
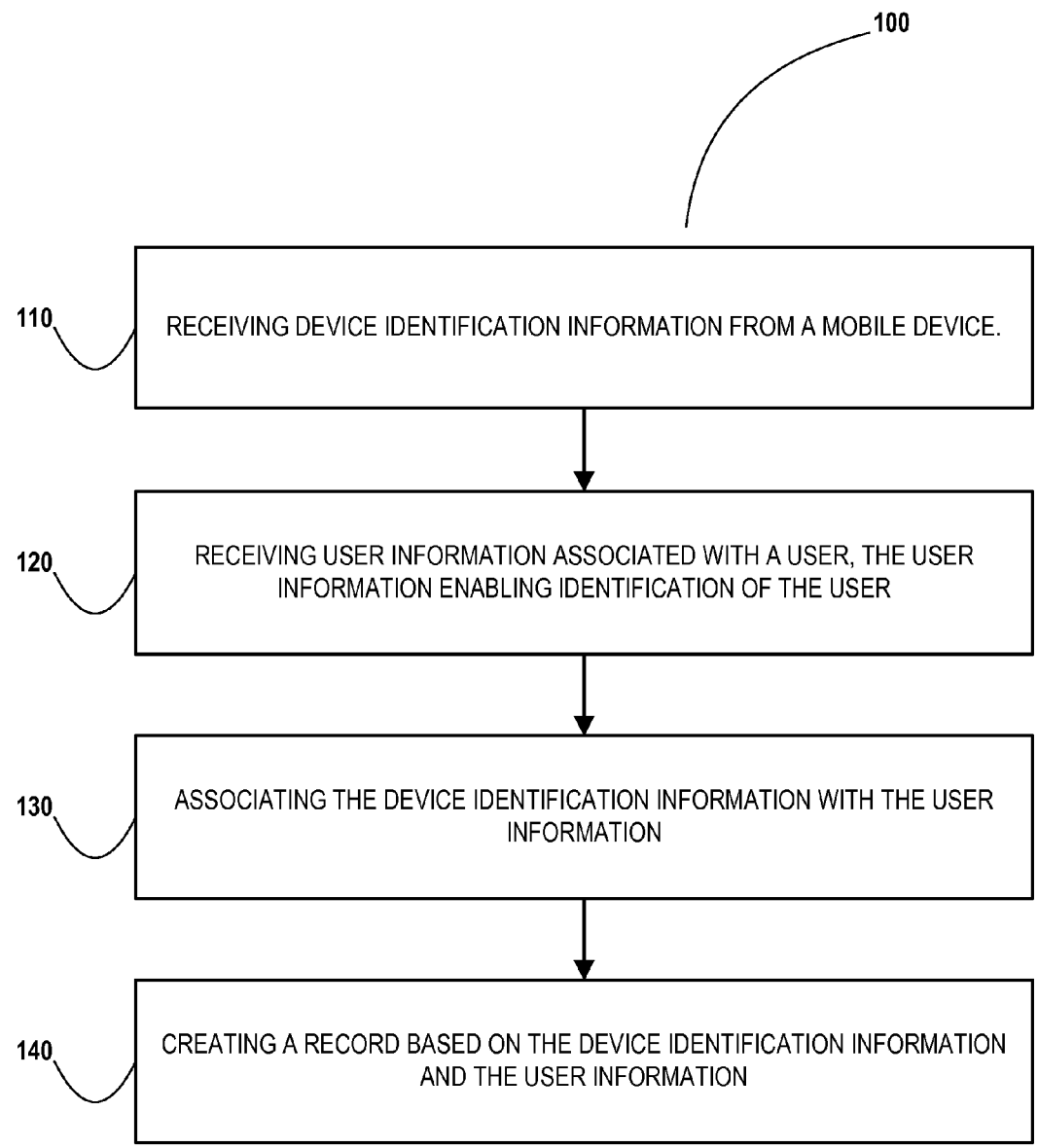
Figure 2:
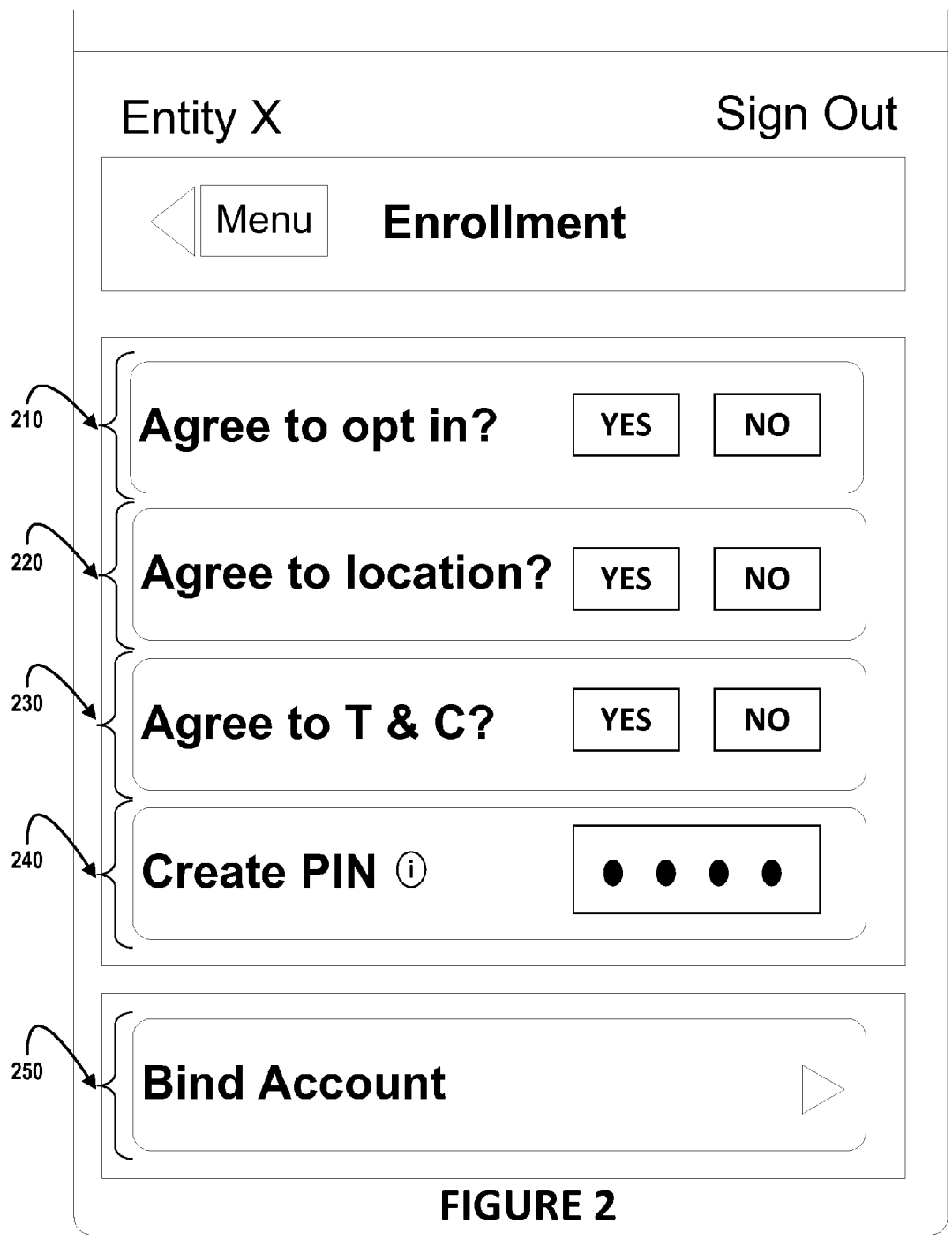

Having thus described embodiments of the invention in general terms, reference will now be made to the accompanying drawings, where:

FIG. 1 is a flowchart illustrating a general process flow for enrolling a user in a device identification program, in accordance with embodiments of the present invention;

FIG. 2 is an exemplary user interface for enrolling a user in a device identification program, in accordance with embodiments of the present invention.

Figure 3:
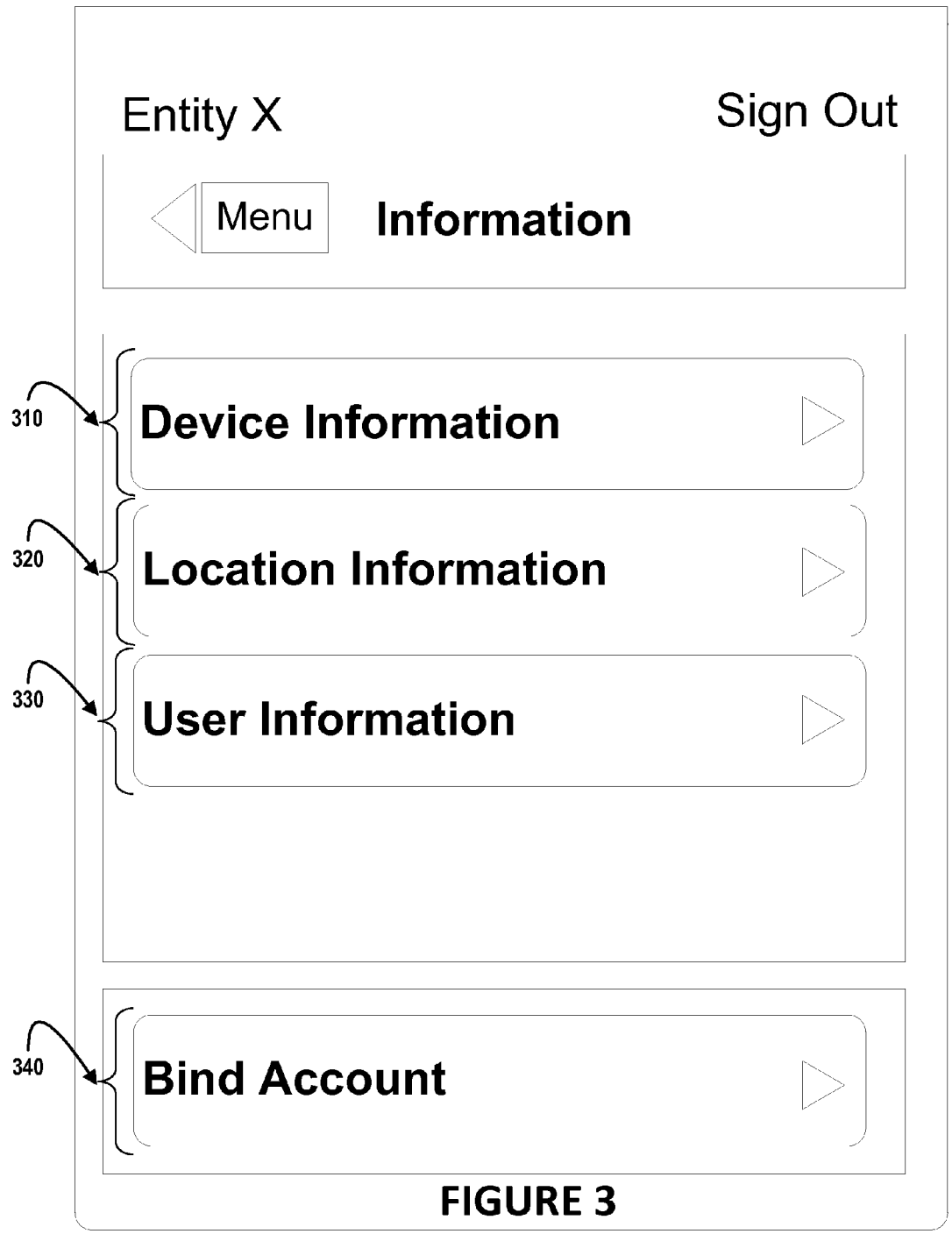

FIG. 3 is an exemplary user interface for manually troubleshooting the enrollment of a user in a device identification program, in accordance with embodiments of the present invention.

Figure 4:
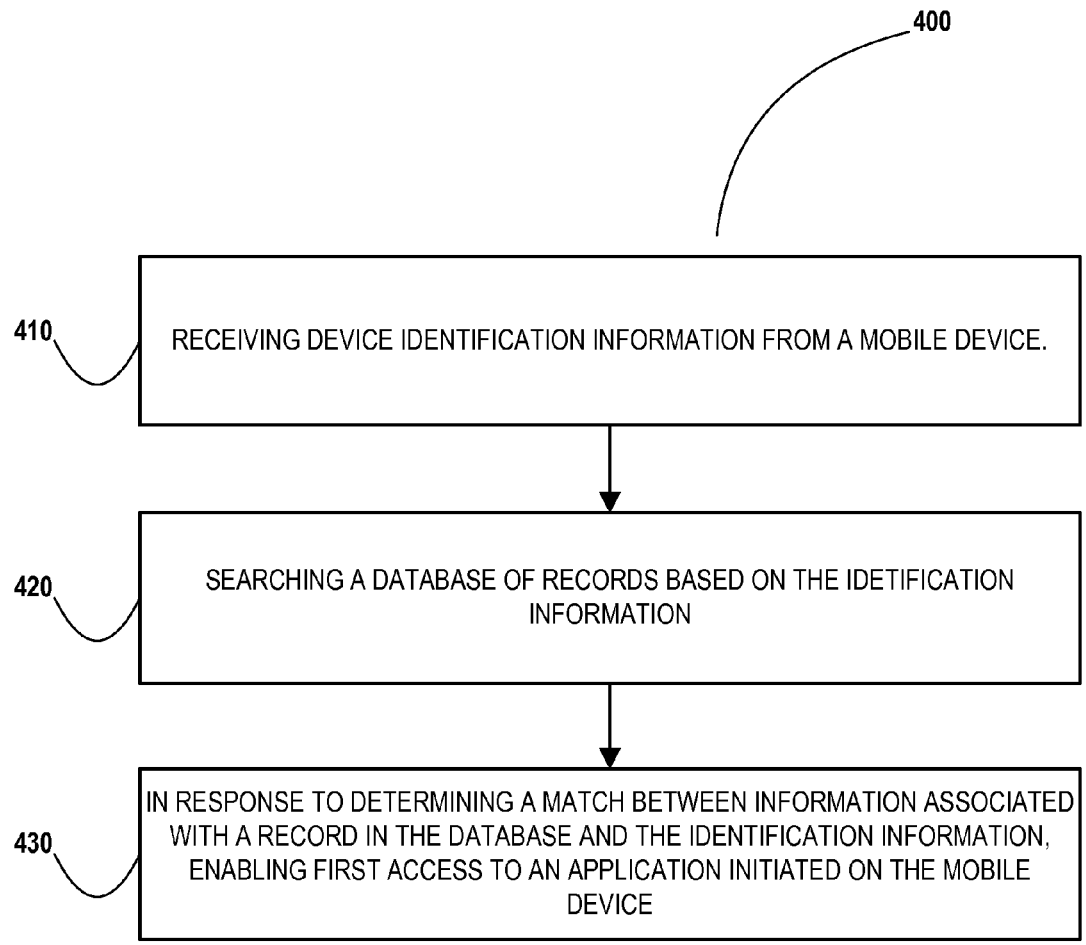

FIG. 4 is a flowchart illustrating a general process flow for application usage in a device identification program, in accordance with embodiments of the present invention.

Figure 5:
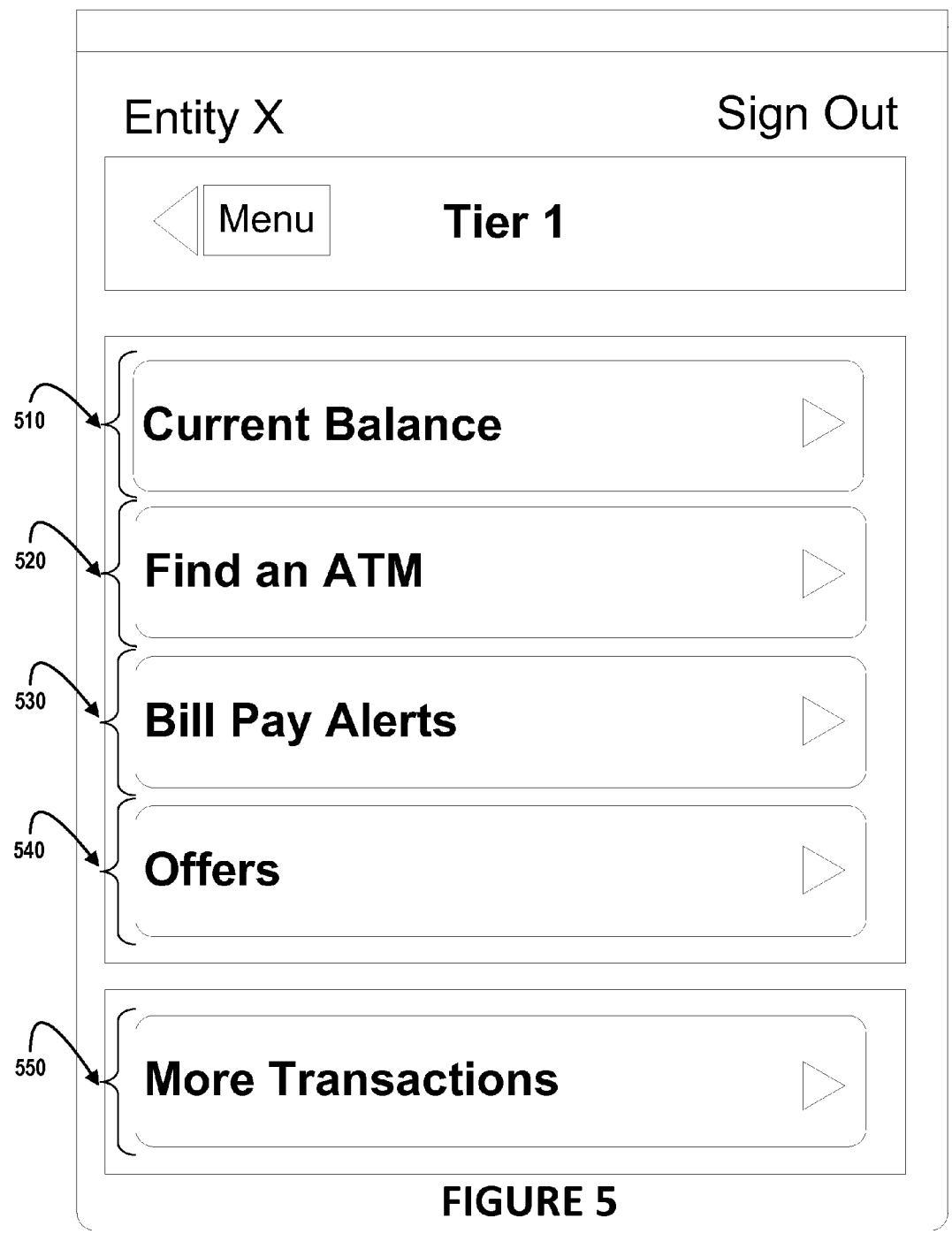

FIG. 5 is an exemplary user interface for selecting a first-tier executable transaction, in accordance with embodiments of the present invention.

Figure 6:
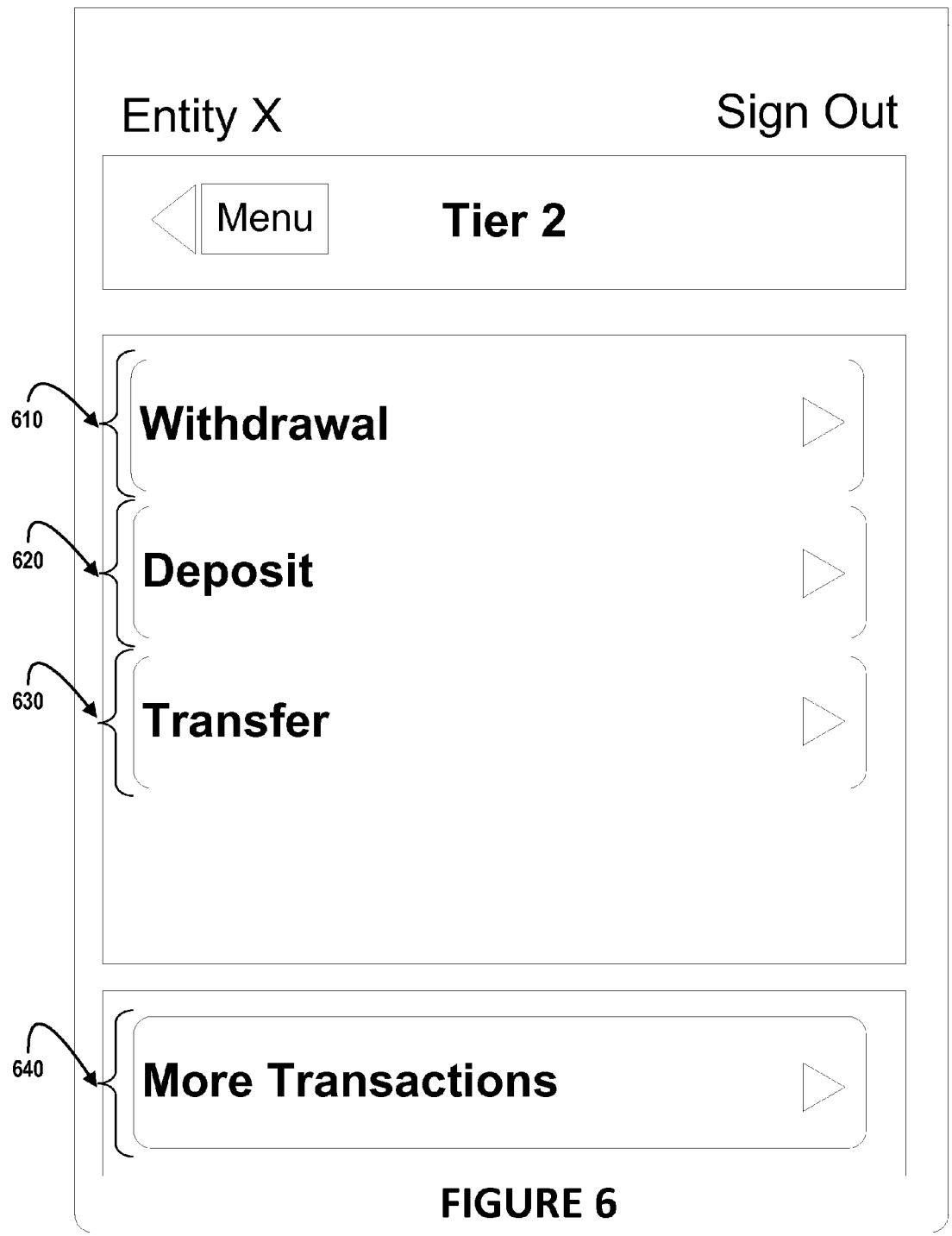

FIG. 6 is an exemplary user interface for selecting a second-tier executable transaction, in accordance with embodiments of the present invention.

Figure 7:
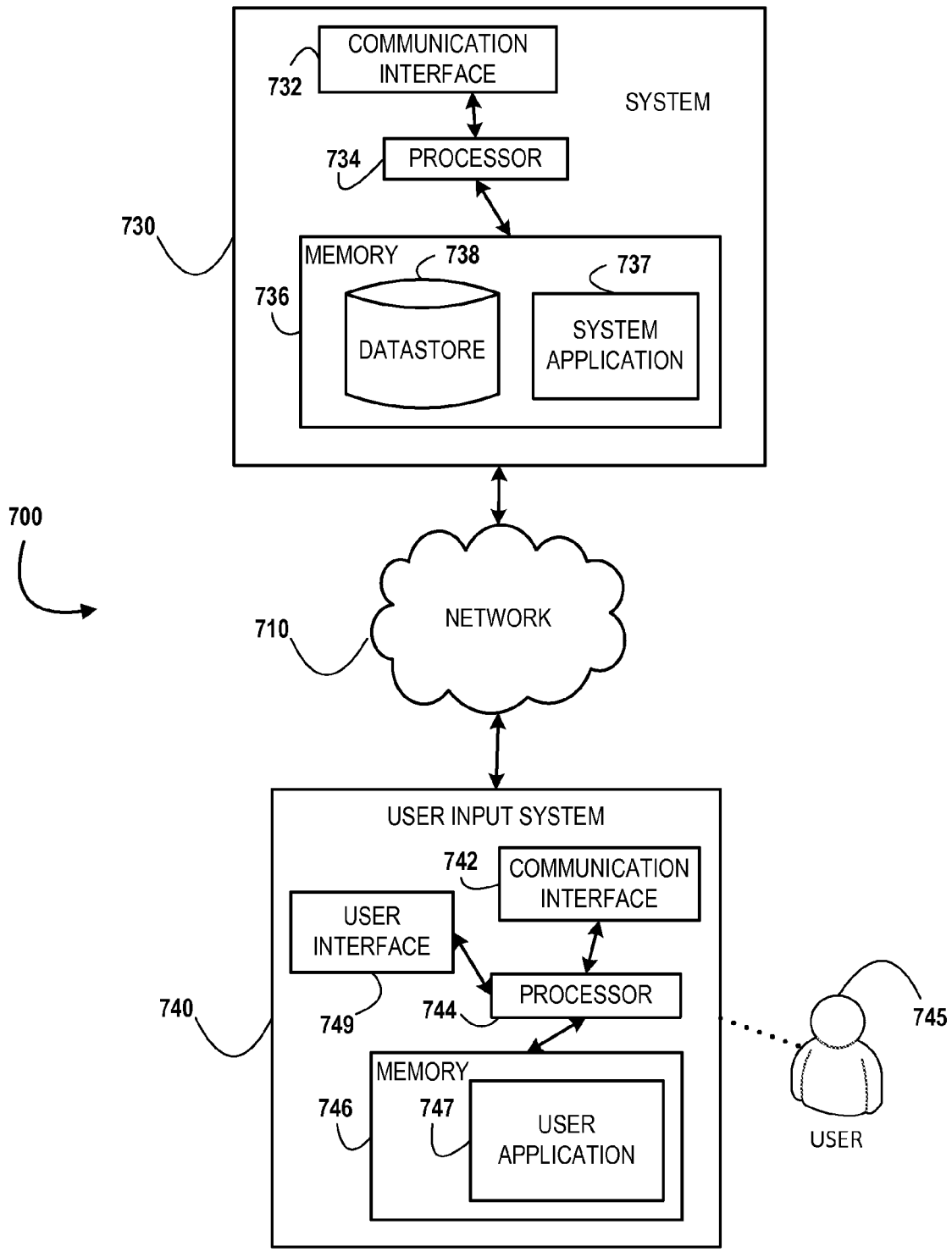

FIG. 7 is a block diagram illustrating technical components of a system for enrolling a user and using an application in a device identification program, in accordance with embodiments of the present invention;

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Embodiments of the invention are directed to systems, methods and computer program products for enrolling a user in a device identification program, in accordance with embodiments of the present invention.

In some embodiments, an "entity" as used herein may be a financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g. a banking account), a savings account, an investment account, a money market account, a time deposit, a demand deposit, a pre-paid account, a credit account, a non-monetary user profile that includes only personal information associated with the user, or the like. The account is associated with and/or maintained by an entity. In other embodiments, an "entity" may not be a financial institution.

In some embodiments, the "user" may be a customer (e.g. an account holder or a person who has an account (e.g. banking account, credit account, or the like) at the entity) or potential customer (e.g. a person who has submitted an application for an account, a person who is the target of marketing materials that are distributed by the entity, a person who applies for a loan that not yet been funded). In other embodiments, the "customer" may refer to the user.

Referring now to FIG. 1, a general process flow 100 is provided for enrolling a user in a device identification program. At block 110, the method comprises receiving device identification information from a mobile device. At block 120, the method comprises receiving user information associated with a user, the user information enabling identification of the user. At block 130, the method comprises associating the device identification information with the user information. At block 140, the method comprises creating a record based on the device identification information and the user information.

The present invention enables an apparatus (e.g. a computing system) associated with the entity to communicate with the user's mobile device (e.g. smart phone, tablet, or the like). The apparatus collects device identification information and user information from the user's mobile device. The apparatus then binds the device identification information with the user information and creates a record. Ultimately the purpose of the apparatus is to correctly associate the user's identity using device identification information and user information.

After properly downloading and opening the entity's mobile application on the user's mobile device, the apparatus transmits to the device an option to enroll in the device identification program. This option can be accepted or ignored. Acceptance may enable the user to execute certain transactions from the mobile device, including but not limited to logging in, viewing account summaries, requesting account withdrawals, check deposits, and other financial transactions. Acceptance of opting in to the device identification program may be required in continuing enrollment in the device identification program. Furthermore, acceptance of opting in may enable the apparatus to access the device identification information and the user information and may include the transmission, sharing, and storing of this information. Ignoring the option to opt in to the device identification program may require the user to log in on the mobile device using a more time-consuming method of entering a username and a password. Thus, the present invention saves the user time when logging in to the entity's application and eliminates the need to remember and enter a username and a password at every launch of the application on the mobile device. Also, the present invention may demand less allocated space on the entity's servers. Utilizing the device identification program eliminates the need to transfer over and store data on the network, which is often typical of checking username and password strings (list of characters, numbers, or the like).

Opting in to the device identification program enables the apparatus to employ a strong authentication process to direct the user throughout enrollment. A strong authentication process is a security measure that requires two or more authentication steps. For example, in a strong authentication process a user may be directed to enter a username, a password, a personal identification number (PIN), a passcode, a biometric (voice) authentication, a fingerprint, a retina scan, or the like, to answer a security question, to transmit device identification information, or the like. The apparatus transmits to the mobile device at least one term or condition associated with the device identification program. In some embodiments, the terms and conditions may be specific to the operation of the device identification program. For example, approving the device identification information terms or conditions may enable the apparatus to collect, transmit, and store information associated with the mobile device. Furthermore, the terms or conditions may address privacy when collecting and storing the device identification information and user information. In other embodiments, the terms and conditions may contain additional information. Acceptance of the terms and conditions of the device identification program may be required to continue through enrollment in the device identification program.

The apparatus gathers device identification information to generate a device "fingerprint," or unique signature of the user's mobile device. Device identification information may be collected from a variety of sources. In some embodiments the device identification information comprises an identification code. The identification code may be but is not limited to a serial number or an item number of the device. In some embodiments, the device identification information may be associated with a chip associated with the mobile device. The chip may be but is not limited to a subscriber identification module (SIM) card, removable hard drive, processor, microprocessor, or the like. In other embodiments, the device identification information may be associated with a removable part of the mobile device. Removable parts include but are not limited to detachable keyboards, battery covers, cases, hardware accessories, or the like. Removable parts may contain serial numbers or part numbers.

In some embodiments, device identification information may need to be entered manually at the mobile device. For example, if the apparatus is unable to locate the mobile device's serial number automatically (perhaps due to interference, long range, or similar hindrance), the apparatus may prompt the user for manual entry of the serial number (or an identification code, an International Mobile Station Equipment Identity (IMEI), a phone number, a chip, a removable part, or similar pieces of device identification information). In other embodiments, device identification information may not be based on user input received at the mobile device. Instead, the apparatus may automatically collect the device identification information. Once discovered by the apparatus, the device identification information is transmitted from the mobile device to the apparatus. This information is stored in memory of the apparatus.

Location information may be necessary to the apparatus's functionality. The apparatus may use location information to determine the location of the user's mobile device. This may be pertinent if certain executable transactions (fund withdrawals, fund deposits, fund transfers, account summaries, or the like) are to be contained within a defined radius of one of the entity's facilities, a regular location (the user's residence, workplace, or any other place that is visited by the user more than a predetermined number of times during a certain period of time), or the like. In some embodiments, location information is recorded and analyzed to determine the habits of the user. Location information is based on a location associated with the mobile device at the time of the initiation or execution of the application on the mobile device. In some embodiments, the apparatus may prompt the user to enable access to the location of the mobile device during the strong authentication process. In other embodiments, the user may enable access to the location of the mobile device through settings, preferences, network, privacy, options, or similar menus.

Following the successful collection of device identification information, the apparatus may collect user information. In some embodiments, the user information is collected after the device identification information and/or location information. In some embodiments, the user information is collected before the device identification information and/or location information. In other embodiments, the user information, the device identification information, and/or location information are collected substantially simultaneously.

The apparatus collects a wide array of user information to prove the identity of the user. In some embodiments, the user information includes but is not limited to at least one of a name, contact information, a username, a password, social network information, an account number, or a card number. In some embodiments, user information can be comprised of an account associated with the user, a unique identification number associated with the user, or the like. In some embodiments, the user information may be proprietary to the entity, such as an account number, a reference number to an account, a client number, or the like. In other embodiments, the user information may be public information, such as a phone number, mailing address, email address, or the like.

The apparatus may automatically retrieve the user information from the user's mobile device. In some embodiments, the user information is collected and transmitted with no human interaction. In other embodiments, the user information is unable to be automatically retrieved by the apparatus. The apparatus may prompt the user to manually enter the user information necessary to continue enrollment. For example, the user may be a new customer and therefore be prompted by the apparatus to register for a new account, complete fields of user information, or complete similar actions on the mobile device. The user may manually enter the user information on the mobile device necessary to continue enrollment. The collected user information is stored in memory on the apparatus.

With the device identification information and the user information in memory, the apparatus is further configured to determine the identity of the user and associate the user with a customer account. The apparatus locates the records in memory that are associated with the device identification information by searching the databases for matching parameters. As described above, the device identification information relates to the unique signature of the mobile device. The device identification information may include but is not limited to an identification code, a serial number, removable parts, a chip, a SIM card, user input, or the like. Additionally or simultaneously, the apparatus locates the records in memory that are associated with the user information by searching the databases for matching parameters. As described above, the user information may relate to a name, contact information, a username, a password, social network information, an account number, a card number, user input, or the like. In some embodiments, the user information may refer to a customer account with the entity. In some embodiments, the user information may refer to a customer account with a partner entity, wherein the data is accessible. In other embodiments, the user information may refer to a customer account with no partner entities and may not be accessible by the apparatus without further consent from the host of the user information.

Successful location of the device identification information and the user information in memory enables the apparatus to identify the user based on the information associated with the account. The apparatus may use a combination of the device identification information and the user information to determine the identity of the user. For example, if the user's address is located in Charlotte, N.C. and the apparatus determines that the user's request is stemming from a mobile device, IP address, or cell tower in Charlotte, N.C., then the apparatus may confirm that the user is indeed correctly identified. Further authentication may or may not be necessary. Conversely, if the user's address is located in Charlotte, N.C. and the apparatus determines that the user's request is stemming from Boston, Mass., then the apparatus may or may not confirm that the user is indeed correctly identified. Further approval or authentication may be required to associate the user's request with an existing customer account. In some embodiments, the apparatus creates a strong binding between the user information and the device information to positively associate the user's customer account with the mobile device. Once the association is made, the apparatus makes a record in memory of the bound association for future reference.

In some embodiments, the user may not be required to input a username or a password when logging in to the entity's application. Instead, the apparatus may automatically collect the necessary information (device identification information and user information) to positively identify the associated user and mobile device. Successful binding of the user's customer account and the mobile device may enable the user to execute certain transactions on the mobile device. In other embodiments, the user may be required to input additional information to authenticate the device identification program. This may include manual entry of the device identification information or manual entry of the user information. For example, the user may be required to enter a username, a password, a PIN number, an answer to a security question, a passcode, a biometric (voice, fingerprint, retina scan, or the like) authentication, or a similar security measure to gain access into the entity's application, complete a transaction, gain access to more advanced transaction types, change settings, preferences, or similar options, or the like. As used herein, the "PIN" may refer to any and all types of security prompts, including but not limited to a username, a password, a PIN, an answer to a security question, a passcode, a biometric (voice, fingerprint, retina scan, or the like) authentication, or a similar security measure. The entity may reserve the right to determine which type of security prompt may be presented to the user at any level of security.

Upon successful enrollment, the apparatus may be configured for normal use. Initiation of the application opens and starts the application on the mobile device. Once running, the application may send to the apparatus the device identification information and the user information. In some embodiments, the device identification information is transmitted to the apparatus before the user information. In some embodiments, the device identification information is transmitted to the apparatus after the user information. In other embodiments, the device identification information and the user information are transmitted to the apparatus simultaneously. Once transmitted, the apparatus receives the device identification information and the user information and records both in memory. The apparatus may search a database of customer account records based on the device identification information and the user information. This associates the device identification information and the user information with the correct user and mobile device. Thus, in response to determining a match between the received device identification information, the received user information, and the record of the user's customer account and mobile device, the apparatus may enable the user to access to the functionality of the application. In some embodiments, the apparatus may enable the user to access to all transactions on the mobile device. In some embodiments, the apparatus may enable the user to access a selected group of transactions on the mobile device. In other embodiments, the apparatus may require additional security measures to enable access to all transactions on the mobile device.

The device identification program may depend on network connectivity, network speeds, network congestion, signal interference, or the like. In some embodiments, unexpected errors may occur during normal installation, operation, or transactions. Potential errors may include but are not limited to run time errors, network connectivity errors, slow network speed errors, network congestion, poor reception, signal interference, dropped packets of information, or the like.

Additionally, the present invention may or may not be limited to the financial domain. The present invention may be highly applicable to other industries and digital services. Any service that requires a username or a password login may benefit from the device identification program. Example beneficiaries outside of the financial domain include but are not limited to social media platforms, email platforms, investment platforms, telecommunications platforms, developer platforms, music services, application stores, or the like.

The apparatus provides or hosts a digital financial service application for mobile device users. Within the application, transactions may include but are not limited to fund withdrawals, account summaries, fund deposits, fund transfers, service requests, creating an account, closing an account, contacting a service assistant, or the like. The apparatus may be created to save the user time and hassle when starting the application and executing financial transactions.

The apparatus interacts with a mobile device that exists as a means of communication between the user and the entity. In some embodiments, the mobile device may be a handheld computing device (laptop, personal digital assistant (PDA), cell phone, smart phone, tablet, mp3 player, chip, or any other electronic device). In other embodiments, the mobile device may be a computer processor (or similar electronic component) that is embedded in existing systems. Examples of an embedded computer processor may be found on satellites, underneath human skin, or the like. FIG. 7 may present a more detailed overview of the communication system of the present invention. In alternate embodiments, the mobile device may comprise or be integrated into a motor vehicle. In other alternate embodiments, the "mobile device" may refer to a non-mobile or non-portable computing device (e.g. a desktop computer, a kiosk, or the like).

Referring now to FIG. 2, FIG. 2 presents a user interface that is presented to the user when the user launches the application to begin the enrollment process, in accordance with some embodiments of the invention. If the user wishes to enroll in the device identification program, the user must agree to opt in 210 to the device identification program. Agreeing to opt in to the device identification program may unlock the options that follow. The user may be required to opt in to the device identification program to continue enrollment. If the user wishes to enable the apparatus to determine the location of the user's mobile device via global positioning system (GPS) coordinates, an IP address, or cell tower location, the user must agree to provide location information 220. The location information may aid in associating the correct device identification information with the user. Thus, the location information may be critical in binding the mobile device to the user's customer account. If the user wishes to continue enrolling in the device identification program, then the user must agree to the Terms or Conditions 230 of the device identification program. Agreeing to the Terms or Conditions may be required to continue through enrollment in the device identification program. The Terms or Conditions may provide an outline of the rules and regulations associated with the device identification program including but not limited to discussions of privacy, operation, contract length, construction, device usage, or the like. If the user wishes to be granted full access to all transaction types and options of the application, the user may create a four-digit PIN 240. This PIN may serve as an additional layer of security that protects the premium features and transactions of the application. An information tab explaining the significance of the PIN may be featured next to the entry field. The user may select "Bind Account" 250 after the above fields have been completed. The "Bind Account" 250 tab initiates the search of records to associate the device identification information and the user information with the user's customer account.

Referring now to FIG. 3, FIG. 3 presents a user interface that is presented to the user in the event that the apparatus was unsuccessful in positively associating the device identification information and the user information. An unsuccessful binding of the user's customer account to the provided device identification information and user information may be a product of several embodiments. In some embodiments, the apparatus may not have received the device identification information from the mobile device. In some embodiments, the apparatus may not have received the user information from the mobile device. In other embodiments, the apparatus may have received an inadequate amount or a rejected combination of device identification information or user information. Potential errors have been discussed above and include but are not limited to network issues, telecommunication issues, being out of range of the network, or the like. In the event that the binding of the user's customer account and the device identification information and the user information, the user interface presented in FIG. 3 will direct the user to manually troubleshoot the issue. Selecting the "Device Information" 310 tab may present to the user a form that enables the user to manually enter information associated with the device. Examples of device identification information are presented more thoroughly above and include but are not limited to identification codes, serial numbers, chips, removable parts, hardware accessories, user input, or the like. Selecting the "Location Information" 320 tab may present to the user a form that enables the user to manually enter information associated with the location of the user and the user's mobile device. Examples of location information are presented more thoroughly above and include but are not limited to GPS coordinates, a residential address, a work address, a shipping address, a zip code, or the like. Selecting the "User Information" 330 tab may present to the user a form that enables the user to manually enter information associated with the user. Examples of user information are presented more thoroughly above and include but are not limited to a name, contact information, a username, a password, social network information, an account number, a card number, user input, or the like. Selecting the "Bind Account" 340 tab initiates the search of records to associate the device identification information, location information, and the user information with the user's customer account.

Referring now to FIG. 4, a general process flow 400 is provided for application usage of a device identification program. At block 410, the method comprises receiving device identification information from a mobile device. At block 420, the method comprises searching a database of records based on the identification information. At block 430, the method comprises enabling first access to an application initiated on the mobile device in response to determining a match between information associated with a record in the database and the identification information.

The present invention enables an apparatus (e.g. a computing system) associated with the entity to communicate with the user's mobile device (e.g. smart phone, tablet, or the like). The apparatus retrieves device identification information and user information from the mobile device to confirm that the user has successfully enrolled in the device identification program. The apparatus then searches a database of records based on the device identification information and the user information. After determining a match between information associated with a record in the database and the device identification information and the user information, the apparatus transmits to the user the first tier of allowed executable transactions (current balance, bill pay alerts, offers, or the like). Access to additional tiers of executable transactions may require deeper authentication, in which the apparatus may prompt the user for a PIN associated with executable transactions. Successful entry of the user's PIN may enable the user to view and execute a broader suite of transactions.

The apparatus may be configured to determine the initiation of the application. In some embodiments, information (e.g. device identification information, user information, location information, or the like) may automatically be transmitted or retrieved by the apparatus, mobile device, or both, upon initiation of the application. In other embodiments, the apparatus may transmit or retrieve information in association with user input.

After the user has downloaded the entity's application on the mobile device, the apparatus may prompt the user to enroll into the device identification program. In some embodiments, the apparatus may guide the user through the enrollment process as described in FIGS. 1-4. In some embodiments, the apparatus may prompt the user to manually enter the device identification information and the user information associated with the user's mobile device and the user's identity. In other embodiments, the apparatus may transmit to the user other enrollment forms to complete user enrollment. Successful user enrollment may be required to operate the application at full capacity.

Upon initiation or during execution of an application wherein the user is previously enrolled in the device identification program, the apparatus may retrieve from the mobile device the device identification information needed to identify the mobile device. The device identification information may be stored in the memory of the apparatus for recall. The device identification information may be used to correctly identify the mobile device associated with the user. Device identification information may include but is not limited to an identification code, a serial number, a chip, a removable part, hardware accessories, user input, or the like.

Upon initiation or during execution of an application wherein the user is previously enrolled in the device identification program, the apparatus may retrieve from the mobile device the user information needed to identify the user's identity. The user information may be retrieved upon initiation of the application. The user information may be stored in the memory of the apparatus for recall. The user information may be used to correctly identify the user associated with the mobile device. User information may include but is not limited to a name, contact information, a username, a password, social network information, an account number, a card number, user input, or the like.

In some embodiments, the apparatus may automatically retrieve from the mobile device the device identification information and the user information. In some embodiments, the device identification information is received by the apparatus before the user information. In some embodiments, the device identification information is received by the apparatus after the user information. In some embodiments, the device information and the user information are received by the apparatus simultaneously. In other embodiments, the device identification information or the user information may be manually entered by the user on the mobile device.

After retrieving the device identification information and the user information from the mobile device, the apparatus then evaluates the device identification information and the user information against the records of potentially associated customer accounts. The purpose of the evaluation is to confirm the relationship between the mobile device, the user identity, and the user's customer account.

In some embodiments, the device identification information and the user information may be positively associated with the user's customer account. The apparatus may confirm the relationship between the device identification information and the user information. The apparatus may then enable user access to the record associated with the user's customer account.

In other embodiments, the device identification information and the user information may not be positively associated with a customer account. The apparatus may prompt the user to provide more information, including but not limited to device identification information, user information, or the like. Further user authorization may enable access to the record of the user's customer account. Confirmation of the relationship between the mobile device and the user's customer account may enable the apparatus to transmit to the mobile device the first tier of executable transactions.

In some embodiments, the device identification program may enable access to the first tier of executable transactions without user input at the mobile device. The first tier of executable transactions may include but is not limited to an account summary, a current balance, an alert associated with a bill, an offer, or the like. In other embodiments, the device identification program may require additional input from the user at the mobile device to enable access to the first tier of executable transactions.

In some embodiments, the first tier of information may include non-public information. Non-public information may include but is not limited to account information, contact information, a username, a password, location information, an IP address, user input, or the like. In other embodiments, the first tier of information may include public information. The entity may reserve the right to deem information public or non-public.

The various tiers of information may comprise access to information associated with the account, which may be associated with a record. In some embodiments, the first tier of information may differ from the second tier of information, which may differ from the third tier of information. The entity may reserve the right to determine the number of tiers of information. Additional security measures may be required to access higher tiers of information or executable transactions.

The apparatus may present to the mobile device a menu of the possible executable transactions. Additionally, the apparatus may present to the mobile device the option to access secondary or tertiary tiers of executable transactions. In some embodiments, the user may be prompted to provide additional security responses to access subsequent tiers of executable transactions. For example, the user may wish to transfer funds between a savings account and a checking account. Because transferring funds is a transaction that may comprise additional layers of security protection, the apparatus may prompt the user for the PIN associated with the device identification program. The user's PIN, perhaps a 4-digit number, may serve as a password that, when entered correctly and confirmed by the apparatus, grants user access to a broader suite of executable transactions, including but not limited to the transferring of funds, fund withdrawals, fund deposits, or the like. Conversely, if a user wishes to check the current balance of a checking account, a first-tier executable transaction, the apparatus may not require any additional security responses.

If a user wishes to access the broader suite of executable transactions, the apparatus may prompt the user to enter the PIN associated with the device identification program. The mobile device may transmit to the apparatus the PIN for confirmation. The apparatus evaluates the PIN against the records associated with the corresponding customer account. In some embodiments, the PIN may be confirmed to be correct. The apparatus may enable user access to the corresponding customer account. Further, the apparatus may present to the mobile device a menu of the broader suite of executable transactions. In other embodiments, the PIN may not be confirmed to be correct. The apparatus may not enable user access to the corresponding customer account. Further, the apparatus may not present to the mobile device a menu of the broader suite of executable transactions. Instead, the apparatus may present to the mobile device a form that allows the user to manually re-enter the PIN or additional security information to retry the confirmation process.

Additionally, location information may be collected by the apparatus to verify the identity of the user. Location information may be based on geographical positioning system (GPS) coordinates, a network location, a mobile tower location, an IP address, or the like. The apparatus may use location information to determine the location of the user's mobile device. Location information may be pertinent if certain tiers of executable transactions are to be contained within a defined radius of one of the entity's facilities, a regular location (the user's residence, workplace, or any other place that is visited by the user more than a predetermined number of times during a certain period of time), or the like.

In some embodiments, the apparatus may retrieve the location information before the device identification information and the user information. In some embodiments, the apparatus may retrieve the location information after the device identification information and the user information. In other embodiments, the apparatus may retrieve the location information, the device identification information, and the user information substantially simultaneously.

In some embodiments, location information may be recorded and analyzed to determine the habits of the user. The apparatus may search a list of permitted locations associated with the record of the user's customer account. The permitted locations may be entered by the user during the enrollment process, configured in settings, network, options, or other preference menus, or automatically determined by the apparatus. In some embodiments, recording permitted locations may enable the apparatus to automatically determine if the location of the mobile device is in accordance with the habits of the user. The apparatus may determine a location to be permitted if the said location has been recorded at least a predetermined number of times. In other embodiments, manual entry of the location information into a list of permitted locations may be required.

Upon the successful matching of the received location information with the user's customer account, the apparatus may grant the user access to the next tier of executable transactions of the application. In some embodiments, the received location information may positively match the user's customer account. Thus, the secondary or tertiary (or subsequent) tiers of executable transactions may be transmitted by the apparatus to the mobile device. In other embodiments, the received location information may not positively match the user's customer account. The user may not be granted access to the subsequent tiers of executable transactions. Further, the apparatus may prompt the user to provide additional information to continue determination of the user's identity, mobile device, and associated customer account.

The device identification program may depend on network connectivity, network speeds, network congestion, signal interference, or the like. In some embodiments, unexpected errors may occur during normal installation, operation, or transactions. Potential errors may include but are not limited to run time errors, network connectivity errors, slow network speed errors, network congestion, poor reception, signal interference, dropped packets of information, or the like.

Additionally, the present invention may or may not be limited to the financial domain. The present invention may be highly applicable to other industries and digital services. Any service that requires a username or a password login may benefit from the device identification program. Example beneficiaries outside of the financial domain include but are not limited to social media platforms, email platforms, investment platforms, telecommunications platforms, developer platforms, music services, application stores, or the like.

The apparatus provides or hosts a digital financial service application for mobile device users. Within the application, transactions may include but are not limited to fund withdrawals, account summaries, fund deposits, fund transfers, service requests, creating an account, closing an account, contacting a service assistant, or the like. The apparatus may be created to save the user time and hassle when starting the application and executing financial transactions.

The apparatus interacts with a mobile device that exists as a means of communication between the user and the entity. In some embodiments, the mobile device may be a handheld computing device (laptop, personal digital assistant (PDA), cell phone, smart phone, tablet, mp3 player, chip, or any other electronic device). In other embodiments, the mobile device may be a computer processor (or similar electronic component) that is embedded in existing systems. Examples of an embedded computer processor may be found on satellites, underneath human skin, or the like. FIG. 7 may present a more detailed overview of the communication system of the present invention.

Referring now to FIG. 5, FIG. 5 presents a user interface that is presented to the mobile device when the user launches the application after successfully enrolling in the device identification program, in accordance with some embodiments of the present invention. The apparatus presents to the user a menu of first-tier executable transactions. If the user wishes to check the current balance of his account, the user may select the 'Current Balance' 510 tab. Selecting this tab may enable the apparatus to present to the user a menu of options to the mobile device. From this menu of options, the user may select which account he wishes to view, the current balance of each account, or the like. If the user wishes to locate one of the entity's facilities, such as an ATM, the user may select the 'Find an ATM' 520 tab. Selecting this tab may enable the apparatus to present to the mobile device a menu of options in regards to locating a facility. Menu options may include but are not limited to the nearest facility, a search by city function, a map view, or the like. If the user wishes to view when certain bills or payments are due, the user may select the 'Bill Pay Alerts' 530 tab. Selecting this tab may enable the apparatus to present to the mobile device a list of alerts associated with payment due dates. If the user wishes to view current offers for his customer account, the user may select the 'Offers' 540 tab. Selecting this tab may enable the apparatus to present to the mobile device a list of offers. The list of offers may include but is not limited to discounts, trial offers, coupons, or the like. If the user wishes to execute a transaction that is not listed on the first tier of executable transactions, the user may select the 'More Transactions" 550 tab. This tab may enable the apparatus to prompt the user for more authentications, such as the user's PIN, location information, all types of security prompts, including but not limited to a username, a password, a PIN, an answer to a security question, a passcode, a biometric (voice, fingerprint, retina scan, or the like) authentication, or a similar security measure. The entity may reserve the right to determine which type of security prompt may be presented to the user at any level of security. Based on successful entry of this information, the apparatus may present the next tier of executable transactions, which are explained in more detail in FIG. 6.

Referring now to FIG. 6, FIG. 6 presents a user interface that is presented to the mobile device when the user wishes to access the second (or third, or subsequent) tier of executable transactions. The user interface in FIG. 6 may be presented after user access has been granted via the user's PIN, location information, or the like. From here, the user may select the 'Withdrawal' 610 tab if he wishes to withdraw funds from an account. Selecting this tab may present to the mobile device a menu of available accounts, the current balance in each account, a history of withdrawal transactions, or the like. If the user wishes to deposit funds, then the user may select the 'Deposit' 620 tab. Selecting this tab may present to the mobile device a menu of available accounts, the current balance in each account, a history of deposit transactions, or the like. If the user wishes to transfer funds, the user may select the 'Transfer' 630 tab. Selecting this tab may present to the mobile device a menu of available accounts, the current balance in each account, a history of transfer transactions, or the like. Other transaction types that are not listed here may be included in the apparatus, and the entity may reserve the right to determine which transactions are included in which tier of executable transactions. If the user wishes to execute a transaction that is not listed on the tier of executable transactions presented in FIG. 6 (e.g. fund transfer, fund deposit, fund withdrawal, or the like), the user may select the 'More Transactions" 640 tab. This tab may enable the apparatus to prompt the user for more authentications, such as the user's PIN, location information, or the like. Based on successful entry of this information, the apparatus may present the next tier of executable transactions.

Referring now to FIG. 7, FIG. 7 presents an exemplary block diagram of the system environment 700 for implementing the process flow described in FIG. 1 and FIG. 4 in accordance with embodiments of the present invention. As illustrated, the system environment 700 includes a network 710, a system 730, and a user input system 740. Also shown in FIG. 7 is a user 745 of the user input system 740. The user input system 740 may be a mobile device described herein. The user 745 may be a person who uses the user input system 740 to execute a user application 747. The user application 747 may be an application to communicate with the system 730, perform a transaction, input information onto a user interface presented on the user input system 740, or the like. The user application 747 and/or the system application 737 may incorporate one or more parts of any process flow described herein.

As shown in FIG. 7, the system 730, and the user input system 740 are each operatively and selectively connected to the network 710, which may include one or more separate networks. In addition, the network 710 may include a telecommunication network, local area network (LAN), a wide area network (WAN), and/or a global area network (GAN), such as the Internet. It will also be understood that the network 710 may be secure and/or unsecure and may also include wireless and/or wireline and/or optical interconnection technology.

The user input system 740 may include any computerized apparatus that can be configured to perform any one or more of the functions of the user input system 740 described and/or contemplated herein. For example, the user 745 may use the user input system 740 to transmit and/or receive information or commands to and from the system 730. In some embodiments, for example, the user input system 740 may include a personal computer system (e.g. a non-mobile or non-portable computing system, a motor vehicle, or the like), a mobile computing device, a personal digital assistant, a mobile phone, a tablet computing device, a network device, and/or the like. As illustrated in FIG. 7, in accordance with some embodiments of the present invention, the user input system 740 includes a communication interface 742, a processor 744, a memory 746 having an user application 747 stored therein, and a user interface 749. In such embodiments, the communication interface 742 is operatively and selectively connected to the processor 744, which is operatively and selectively connected to the user interface 749 and the memory 746. In some embodiments, the user 745 may use the user application 747 to execute processes described with respect to the process flows described herein. Specifically, the user application 747 executes the process flow described in FIG. 1 and FIG. 4.

Each communication interface described herein, including the communication interface 742, generally includes hardware, and, in some instances, software, that enables the user input system 740, to transport, send, receive, and/or otherwise communicate information to and/or from the communication interface of one or more other systems on the network 710. For example, the communication interface 742 of the user input system 740 may include a wireless transceiver, modem, server, electrical connection, and/or other electronic device that operatively connects the user input system 740 to another system such as the system 730. The wireless transceiver may include a radio circuit to enable wireless transmission and reception of information. Additionally, the user input system 740 may include a positioning system. The positioning system (e.g. a global positioning system (GPS), a network address (IP address) positioning system, a positioning system based on the nearest cell tower location, or the like) may enable at least one of the user input system 740 or an external server or computing device in communication with the user input system 740 to determine the location (e.g. location coordinates) of the user input system 740.

Each processor described herein, including the processor 744, generally includes circuitry for implementing the audio, visual, and/or logic functions of the user input system 740. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the user application 747 of the memory 746 of the user input system 740.

Each memory device described herein, including the memory 746 for storing the user application 747 and other information, may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

As shown in FIG. 7, the memory 746 includes the user application 747. The user application 747 may be associated with various features of the device identification program. In some embodiments, the user application 747 includes an interface for communicating with, navigating, controlling, configuring, and/or using the user input system 740. In some embodiments, the user application 747 includes computer-executable program code portions for instructing the processor 744 to perform one or more of the functions of the user application 747 described and/or contemplated herein. In some embodiments, the user application 747 may include and/or use one or more network and/or system communication protocols.

Also shown in FIG. 7 is the user interface 749. In some embodiments, the user interface 749 includes one or more output devices, such as a display and/or speaker, for presenting information to the user 745. In some embodiments, the user interface 749 includes one or more input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the user 745. In some embodiments, the user interface 749 includes the input and display devices of a mobile device, which are operable to receive and display information.

FIG. 7 also illustrates a system 730, in accordance with an embodiment of the present invention. The system 730 may refer to the "apparatus" described herein. The system 730 may include any computerized apparatus that can be configured to perform any one or more of the functions of the system 730 described and/or contemplated herein. In accordance with some embodiments, for example, the system 730 may include a computer network, an engine, a platform, a server, a database system, a front end system, a back end system, a personal computer system, and/or the like. Therefore, the system 730 may be a server managed by the entity. The system 730 may be located at the facility associated with the entity or remotely from the facility associated with the entity. In some embodiments, such as the one illustrated in FIG. 7, the system 730 includes a communication interface 732, a processor 734, and a memory 736, which includes a system application 737 and a datastore 738 stored therein. As shown, the communication interface 732 is operatively and selectively connected to the processor 734, which is operatively and selectively connected to the memory 736.

It will be understood that the system application 737 may be configured to implement any one or more portions of the various user interfaces and/or process flow described herein. The system application 737 may interact with the user application 747. It will also be understood that, in some embodiments, the memory includes other applications. It will also be understood that, in some embodiments, the system application 737 is configured to communicate with the datastore 738, the user input system 740, or the like.

It will be further understood that, in some embodiments, the system application 737 includes computer-executable program code portions for instructing the processor 734 to perform any one or more of the functions of the system application 737 described and/or contemplated herein. In some embodiments, the system application 737 may include and/or use one or more network and/or system communication protocols.

In addition to the system application 737, the memory 736 also includes the datastore 738. As used herein, the datastore 738 may be one or more distinct and/or remote datastores. In some embodiments, the datastore 738 is not located within the system and is instead located remotely from the system. In some embodiments, the datastore 738 stores information or data described herein. For example, the datastore 738 may store information associated with the user's account.

It will be understood that the datastore 738 may include any one or more storage devices, including, but not limited to, datastores, databases, and/or any of the other storage devices typically associated with a computer system. It will also be understood that the datastore 738 may store information in any known way, such as, for example, by using one or more computer codes and/or languages, alphanumeric character strings, data sets, figures, tables, charts, links, documents, and/or the like. Further, in some embodiments, the datastore 738 may include information associated with one or more applications, such as, for example, the system application 737. It will also be understood that, in some embodiments, the datastore 738 provides a substantially real-time representation of the information stored therein, so that, for example, when the processor 734 accesses the datastore 738, the information stored therein is current or substantially current.

It will be understood that the embodiment of the system environment illustrated in FIG. 7 is exemplary and that other embodiments may vary. As another example, in some embodiments, the system 730 includes more, less, or different components. As another example, in some embodiments, some or all of the portions of the system environment 700 may be combined into a single portion. Likewise, in some embodiments, some or all of the portions of the system 730 may be separated into two or more distinct portions.

In addition, the various portions of the system environment 700 may be maintained for and/or by the same or separate parties. It will also be understood that the system 730 may include and/or implement any embodiment of the present invention described and/or contemplated herein. For example, in some embodiments, the system 730 is configured to implement any one or more of the embodiments of the process flows described and/or contemplated herein in connection any process flow described herein. Additionally, the system 730 or the user input system 740 is configured to initiate presentation of any of the user interfaces described herein.

In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, microcode, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. An apparatus for enrolling a user in a device identification program, in accordance with embodiments of the present invention, the apparatus comprising:
   a memory;
   a processor; and
   a module stored in the memory, executable by the processor, and configured to:
   receive device identification information from a mobile device, wherein the device information comprises at least one of a serial number of a removable part of the mobile device, an international mobile station equipment identity code, mobile location information, and/or a serial number associated with a subscriber identification module;
   receive user information associated with the user, the user information enabling identification of the user;
   determine a financial institution account of the user corresponding to the received device information and the received user information;
   authenticate the user based on at least determining the financial institution account of the user based on at least the received device identification information and the received user information;
   determine a location of the mobile device;
   enable a user access to a first tier of executable transactions associated with the financial institution account of the user, wherein the first tier of executable transactions comprises at least one of access to a current balance, a bill pay alert, and an offer, wherein the first tier of executable transactions are configured to be executed on the mobile device when the mobile device is located within a predefined radius of one or more facilities associated with the financial institution;
   search a list of permitted locations associated with the financial institution account;
   determine whether the location matches a permitted location from the list of permitted locations;
   in response to determining the location matches the permitted location, enable the user access on the mobile device to a second tier of executable transactions associated with the financial institution account of the user, wherein the permitted location is a location from where the user previously accessed the first tier of executable transactions or the second tier of executable transactions on the mobile device at least a predetermined number of times.

2. The apparatus of claim 1, wherein the module is further configured to transmit to the mobile device an option to enroll in a device identification program.

3. The apparatus of claim 2, wherein the module is further configured to transmit to the mobile device at least one term or condition associated with the device identification program.

4. The apparatus of claim 1, wherein the module is further configured to receive the user's approval to enroll in a device identification program.

5. The apparatus of claim 1, wherein the module is further configured to receive the user's approval to receive location information associated with the mobile device.

6. The apparatus of claim 1, wherein the user information is received after the device identification information.

7. The apparatus of claim 1, wherein the user information comprises at least one of information associated with the user or an account associated with the user.

8. The apparatus of claim 1, wherein the user information comprises at least one of a name, contact information, a username, a password, social network information, an account number, or a card number.

9. The apparatus of claim 1, wherein the device identification information comprises an identification code.

10. The apparatus of claim 1, wherein the device identification information is associated with a chip or a removable part associated with the mobile device.

11. The apparatus of claim 1, wherein the device identification information is not based on user input received at the mobile device.

12. The apparatus of claim 1, wherein the user information is based on user input received at the mobile device.

13. The apparatus of claim 1, wherein the mobile device comprises at least one of a mobile communication device or a mobile computing device.

14. The apparatus of claim 1, wherein the module is further configured to:
   determine an account associated with the user information; and
   identify the user based on information associated with the account.

15. The apparatus of claim 1, wherein the module is further configured to:
   determine initiation of an application on the mobile device;
   receive second identification information from the mobile device;
   search a database of records based on the second identification information; and
   in response to determining a match between the identification information associated with the record and the second identification information, enable access to the application.

16. The apparatus of claim 15, wherein the application comprises a financial service application.

17. The apparatus of claim 15, wherein the module is further configured to enable access to the application based on a location associated with the mobile device at the time of the initiation of the application on the mobile device.

18. A method for enrolling a user in a device identification program, the method comprising:
   receiving, using a computing device processor, device identification information from a mobile device, wherein the device information comprises at least one of a serial number of a removable part of the mobile device, an international mobile station equipment identity code, mobile location information, and/or a serial number associated with a subscriber identification module;

receiving, using a computing device processor, user information associated with the user, the user information enabling identification of the user;

determining, using a computing device processor, a financial institution account of the user corresponding to the received device information and the received user information;

authenticating, using a computing device processor, the user based on at least determining the financial institution account of the user based on at least the received device identification information and the received user information;

determining, using a computing device processor, a location of the mobile device;

enabling, using a computing device processor, a user access to a first tier of executable transactions associated with the financial institution account of the user, wherein the first tier of executable transactions comprises at least one of access to a current balance, a bill pay alert, and an offer, wherein the first tier of executable transactions are configured to be executed on the mobile device when the mobile device is located within a predefined radius of one or more facilities associated with the financial institution;

searching, using a computing device processor, a list of permitted locations associated with the financial institution account;

determining, using a computing device processor, whether the location matches a permitted location from the list of permitted locations;

in response to determining the location matches the permitted location, enabling, using a computing device processor, the user access on the mobile device to a second tier of executable transactions associated with the financial institution account of the user, wherein the permitted location is a location from where the user previously accessed the first tier of executable transactions or the second tier of executable transactions on the mobile device at least a predetermined number of times.

19. A computer program product for enrolling a user in a device identification program, the computer program product comprising:

a non-transitory computer-readable medium comprising a set of codes for causing a computer to:

receive device identification information from a mobile device, wherein the device information comprises at least one of a serial number of a removable part of the mobile device, an international mobile station equipment identity code, mobile location information, and/or a serial number associated with a subscriber identification module;

receive user information associated with the user, the user information enabling identification of the user;

determine a financial institution account of the user corresponding to the received device information and the received user information;

authenticate the user based on at least determining the financial institution account of the user based on at least the received device identification information and the received user information;

determine a location of the mobile device;

enable a user access to a first tier of executable transactions associated with the financial institution account of the user, wherein the first tier of executable transactions comprises at least one of access to a current balance, a bill pay alert, and an offer, wherein the first tier of executable transactions are configured to be executed on the mobile device when the mobile device is located within a predefined radius of one or more facilities associated with the financial institution;

search a list of permitted locations associated with the financial institution account;

determine whether the location matches a permitted location from the list of permitted locations;

in response to determining the location matches the permitted location, enable the user access on the mobile device to a second tier of executable transactions associated with the financial institution account of the user, wherein the permitted location is a location from where the user previously accessed the first tier of executable transactions or the second tier of executable transactions on the mobile device at least a predetermined number of times.

* * * * *